Figure 1:
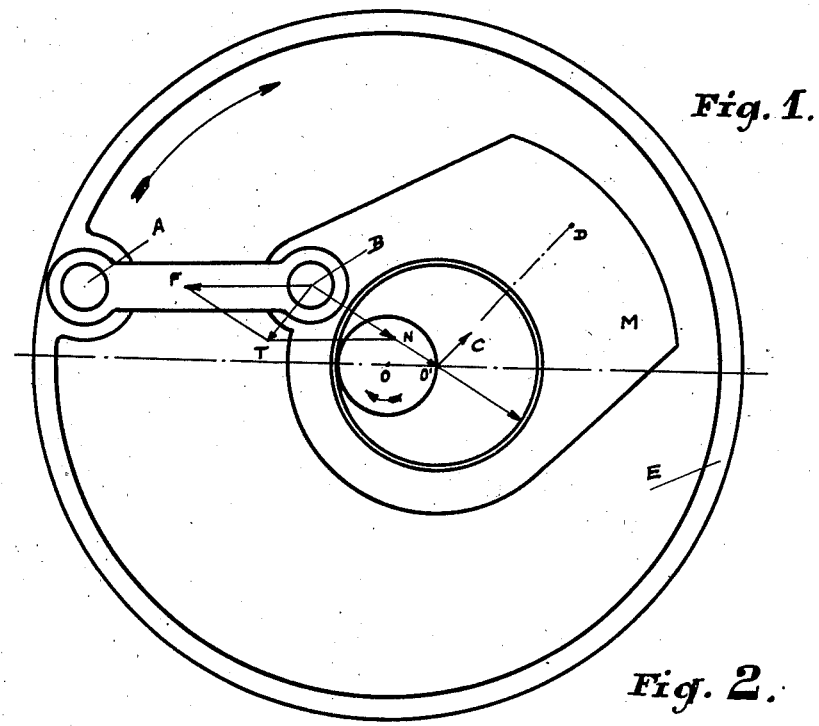

Jan. 3, 1939.                    F. SUYS                    2,142,421
                    VARIABLE SPEED TRANSMISSION DEVICE
                         Filed Jan. 7, 1937            2 Sheets-Sheet 1

Inventor:
Ferdinand Suys

Inventor:

Patented Jan. 3, 1939

2,142,421

UNITED STATES PATENT OFFICE

2,142,421

VARIABLE SPEED TRANSMISSION DEVICE

Ferdinand Suys, Meysse, Belgium, assignor to Société pour le Perfectionnement et l'Exploitation des Transmissions Mecaniques (Perfectrans), Brussels, Belgium, a limited company of Belgium Application January 7, 1937, Serial No. 119,418 In Great Britain February 15, 1936

2 Claims. (Cl. 74—64)

This invention relates to an improved variable speed transmission utilizing inertia forces of masses for the transmission of mechanical energy from a driving shaft to a driven shaft, at a speed which varies automatically and gradually according to the resistance opposed by the driven shaft and to the power available on the driving shaft.

Transmissions of this kind comprise annular masses or flyweights rotating around discs which are integral of the driven shaft and are eccentrically arranged relatively to the axis of the driven shaft. Each of the annular masses or fly-weights is brought into motion by a link or the like which is articulated at its other end to a member integral with the driving shaft. Each flyweight is thus subjected to positive and negative accelerations. If the flyweight is an unbalanced flywheel, that is if its centre of gravity does not coincide with the centre of the eccentric disc around which it rotates, the centrifugal force which acts upon the unbalanced part of the flywheel produces driving efforts on the eccentric disc which is integral with the driven shaft. These efforts tend to rotate the driven shaft either in one or in the other direction. Use has previously been made of the two alternations of the torque produced by the centrifugal forces either by utilizing double ratchet wheels, or double gear trains acting in directions opposite to one another, one of the gear trains being clutched whilst the other gear train is unclutched, in order to convert an alternating torque into a continuous torque.

Such systems have the drawback of requiring complicated mechanisms, of being unreliable in operation, of being comparatively heavy per unit of work performed, etc.

The present invention consists in an automatic variable speed transmission of the type comprising an unbalanced annular mass or flyweight rotating with a cyclically variable speed around an eccentric disc or crank integral with the driven shaft, the motion being imparted to the said unbalanced mass or flyweight by means of a link which receives the motion from the driving member, the variable centrifugal forces producing a torque acting on the driven shaft in alternate directions, the invention being characterized in that the centre of gravity of the unbalanced part of the annular mass or flyweight is situated at an angle from 80° to 130° in advance of the point of connection of the driving link on to the annular mass subtended at the centre of the eccentric disc, the said point of connection being in advance relatively to the other end of the said link, the angles being measured in the direction of rotation of the driven shaft, whatever the direction of rotation of the driving shaft may be.

Use may be made in such a transmission of a plurality of unbalanced rotating masses or flyweights, working independently of one another in multiple phase in the manner above described.

Figure 2:
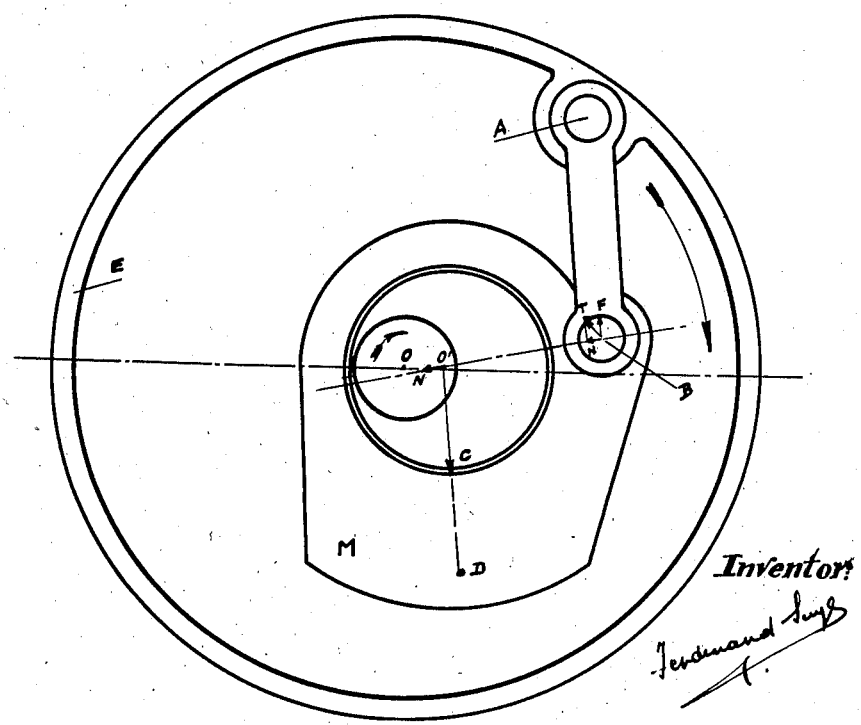
Figure 3:
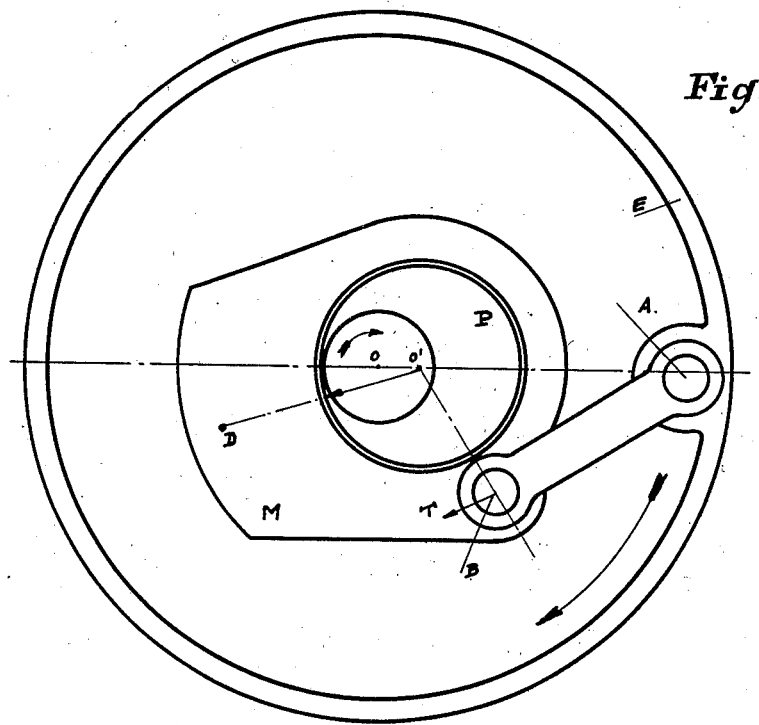
Figure 4:
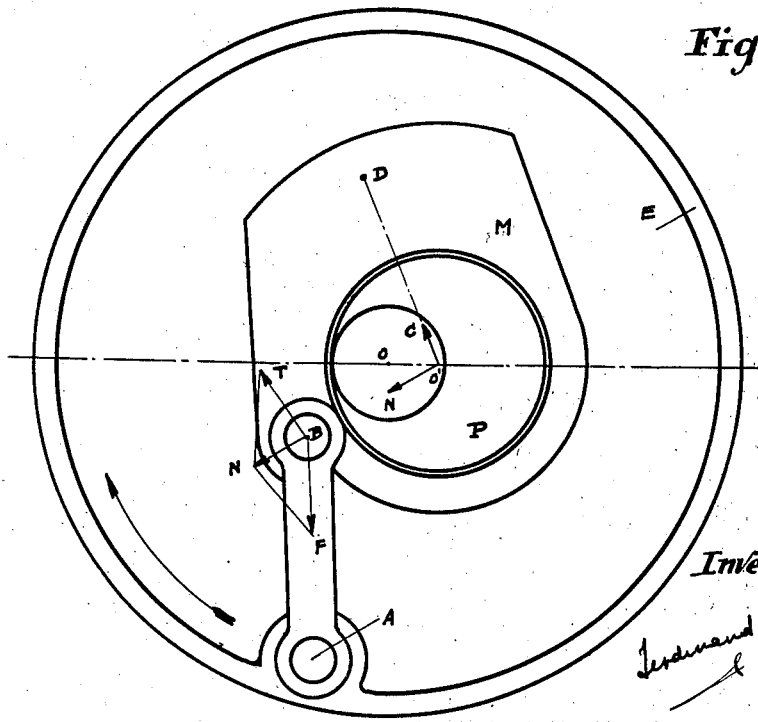

Figs. 1 to 4 of the accompanying drawings show one mode of carrying the invention into effect.

Referring to the drawings, A is the linking point of the link AB on to the member E which is integral with the driving shaft and has an axis O. B is the linking point of the link on to the annular mass or flyweight M, the centre of gravity of the unbalanced part of the mass is at D; the annular mass rotates around the eccentric disc P integral with the driven shaft of axis O. The centre of the eccentric disc P is at O'.

The action of the centrifugal forces acting on the unbalanced part of the flyweight, the centre of gravity of which is at D, is best utilized when the point of connection B of the link AB onto the flyweight is so located that the angle BO'D subtended at the centre O' of the disc P has a value comprised between 80° and 130°. The exact value depends somewhat, in each particular case on the geometrical relations of the various parts of the system. The angle BO'D must be read in the sense of rotation of the driven shaft, whatever the sense of rotation of the driving shaft may be.

The reason for this main characteristic of the invention is the following:

The flyweight has its minimum speed when the point B is in the vicinity of the left end of the line OO' (according to the figures). If then the unbalanced mass D is at an angle BO'D in advance of the radius BO', the centrifugal force C acting on D has a minimum value and its antagonistic couple on the eccentric disc is also minimum.

On the contrary, the speed of the flyweight is maximum when the point B passes in the vicinity of the right end of the line OO'. If then the centre of gravity D is at an angle BO'D in advance of the radius BO', the centrifugal force C acting on D is maximum and the active couple on the eccentric disc is also maximum. Thus, after a complete revolution a highly positive resultant impulse on the eccentric disc is obtained by difference.

It should be further noted that the speed variations of the annular masses or flyweights, which are required for obtaining variable centrifugal forces, produce also tangential inertia forces which combine with the oblique forces produced in the links and act upon the eccentric discs integral with the driven shaft. This leads to a subsidiary feature of the invention according to which the necessary speed variations of the flyweights are produced, in such a way that the combination of the forces in the links and the tangential inertia forces of the flyweights give practically no reversed torques on the driven shaft, but positive ones nearly always.

Figures 1 to 4 show four successive phases of the motion of one and the same link and flyweight system.

The radial force N resulting from the action of the tangential inertia force T and of the force F in the link, has a tendency to cause the rotation of the centre O' around O in the clockwise direction. This is true for all the positions of the link provided that the angle ABO' does not become smaller than 87°, preferably not smaller than 90°. If the driving point A were to rotate in an anticlockwise direction, the forces T, F and N would remain directed as shown in Figures 1 to 4, and the two shafts would rotate in opposite directions. In this case however, the losses by friction between the masses N and the discs P would be greatly increased.

In the first zone (Fig. 1), the mass M is subjected to a great positive acceleration when the point A rotates in the clockwise direction. The radial force N is therefore relatively important and supplies a high driving torque. On the contrary the average speed of the flyweight M is small. The reversed couple resulting from the action of the centrifugal force C on the centre of gravity D is itself small and may be overcome by the couple produced by N if the ratio of the total mass of the flyweight to the unbalanced mass is suitably chosen.

In the second zone (Fig. 2) the tangential inertia force T and the radial force N depending thereon, decrease rapidly. Their decrease is compensated by the action of the centrifugal force C which is now directed in such a manner that the torque on the driven shaft is positive. Moreover the value of the force C increases rapidly.

In the third zone (Fig. 3) the flyweights begin to decelerate. The tangential force T is directed in the direction of the motion and increases gradually. The radial force N gives again a positive couple if the angle ABO' is greater than 90°. (In Fig. 3, this angle has precisely the particular value of 90°, and thus the value of N is zero). This increasing couple is added to the still positive couple produced by the centrifugal force acting on point D and which diminishes gradually.

In the fourth zone (Fig. 4), there is an important retardation of the flyweight. Its speed decreases rapidly, thus reducing the size of the centrifugal force C according to the square of the speed value. The radial force N which is again important, owing to the great value of the force T, has a tendency to compensate the action of the antagonistic force C which has already passed beyond the line of the centres O and O'.

A short reversal of the driving torque takes place towards the end of the fourth quarter and at the beginning of the first quarter. It should be noted that the separation into quarter zones above described relates to the instantaneous position of the point B of the link. In other words, a long period of positive torque is obtained, followed by a short antagonistic period of reversed torque.

In order to obtain an even working of the torque on the driven shaft, use is preferably made of a plurality of annular masses or flyweights rotating in multiple phase around several eccentric discs integral with the driven shaft. The respective centres of the various discs are distributed around the axis of the said driven shaft. The articulations of the corresponding links on to the driving shaft may be situated along one or several longitudinal bars or the like, driven together by the driving shaft. The position of the bars, combined with those of the centres of the eccentric discs is such that the cyclical speed variations of the annular masses are dephased relatively to one another. A practically constant average driving torque is thus obtained without the necessity of using additional balancing and regulating masses.

Use may also be made for each phase of two annular masses or flyweights, the respective eccentric discs and links of which are symmetrically arranged relatively to the axis of the driven shaft and of the driving shaft, the two axes being symmetrically on opposite sides thereof.

I claim:

1. An automatic variable speed transmission comprising coaxial driving and driven shafts, an unbalanced mass rotating with a cyclically variable speed around an eccentric member integral with the driven shaft, a link receiving its motion from the driving member and imparting this motion to the said unbalanced mass, the centre of gravity of the unbalanced mass being situated at an angle of about 90° in advance of the point of connection of the driving link on to the annular mass subtended at the centre of the eccentric disc, the said point of connection being in advance relatively to the other end of the said link, the angles being measured in the direction of rotation of the driven shaft, whatever the direction of rotation of the driving shaft may be, the length of the link, the eccentricity of the disc integral with the driven shaft, the distance between the point of connection of the link to the eccentric mass and the centre of the disc and the radius of the circle described by the point of connection of the link with the driving member, being in such ratios that the angle made by the link with the radius of the eccentric disc passing through the link's point of connection with the eccentric mass shall be always greater than 87°.

2. An automatic variable speed transmission comprising a plurality of unbalanced masses rotating around a plurality of eccentric discs, all integral with the driven shaft, the respective centres of the said discs being evenly distributed around the axis of the said shaft, the points of connection of the links with the driving member being situated in such a manner that the cyclical variations of speed of the various eccentric masses shall be dephased relatively to one another, and the centre of gravity of each unbalanced mass being situated at an angle of about 90° in advance of the point of connection of the driving link on to the annular mass subtended at the centre of the eccentric disc, the said point of connection being in advance relatively to the other end of the said link, the angles being measured in the direction of rotation of the driven shaft, whatever the direction of rotation of the driving shaft may be, and the distance between the point of connection of the link to the eccentric mass and the centre of the disc and the radius of the circle described by the point of connection of the link with the driving member, being in such ratios that the angle made by the link with the radius of the eccentric disc passing through the link's point of connection with the eccentric mass shall be always greater than 87°.

FERDINAND SUYS.